Feb. 18, 1930.   G. F. HAVLISTA   1,747,713
MILLING CUTTER
Filed Nov. 1, 1923

George F. Havlista
INVENTOR.
BY Fred G. Parsons
ATTORNEY.

Patented Feb. 18, 1930

1,747,713

UNITED STATES PATENT OFFICE

GEORGE F. HAVLISTA, OF MILWAUKEE, WISCONSIN, ASSIGNOR TO KEARNEY & TRECKER CORPORATION, OF WEST ALLIS, WISCONSIN, A CORPORATION OF WISCONSIN

MILLING CUTTER

Application filed November 1, 1923. Serial No. 672,200.

This invention relates to an improvement in a milling cutter, and more particularly to that type of cutter commonly known as a face or end mill, in which the axis of the rotation of the cutter is vertical to the surface produced upon the work; or in other words, in which the cutter is rotated and traversed across the work surface to produce a plane surface vertical to the axis of cutter rotation.

Such cutters ordinarily have a plurality of teeth or blades which may be integral with the body of the cutter or may be separate pieces fixed in a cutter body by a variety of well-known holding means.

In operation the teeth of such a cutter meet the work which is being operated upon with considerable force and abruptness, setting up a series of shocks, the magnitude of which is dependent partly upon the depth of the metal to be removed and partly upon the number of teeth or blades, the speed of rotation, the feed per revolution, and the material of which the work is composed.

Furthermore, in leaving the work, the teeth or blades will ordinarily break out portions of the work material extending below the normal cutting face of the blades, or below the normal cutting plane of the cutter and into portions of the work which it is not ordinarily desired to remove, thus creating a ragged and uneven corner and surface.

In cases where the work is of relatively thin dimensions, and especially when a thin work dimension stands at right angles to the plane of the surface produced by the cutter, it frequently happens that the work or cutter is seriously damaged by the above described cutter action. The shock incidental to the engagement of the teeth with the work may crack or break the work due to its thin dimension; and furthermore, such thin dimensions are the source of a springing action in the work which tends to aggravate considerably the above-mentioned breaking away of portions of the work material as the cutter tooth leaves the work.

It is the purpose of this invention to provide a cutter tooth of a form and construction which will tend to remedy such difficulties and which will permit the cutter tooth to engage the work with minimum shock and to disengage the work with a minimum removal or breaking out of the work material below the surface desired to be finished by the cutter.

A further purpose is generally to improve the construction and operation of milling cutters.

In the accompanying drawings, like reference characters refer to the same parts in the various figures, in which.

A cutter body 1 has fixed therewith a plurality of cutting blades 2 and is adapted to be mounted upon and driven by the spindle of a milling machine, or upon an arbor to be driven by a milling machine spindle.

Figure 1:
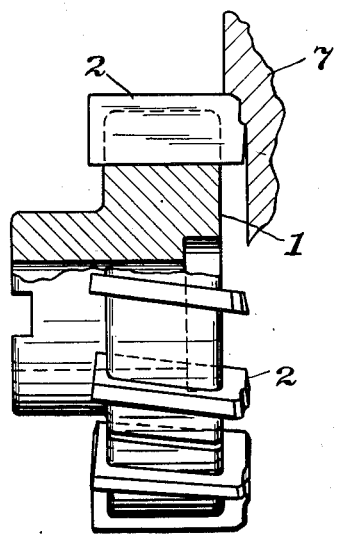
Figure 1 is a side view, partly in section, of an inserted tooth face milling cutter embodying my invention.
Figure 2:
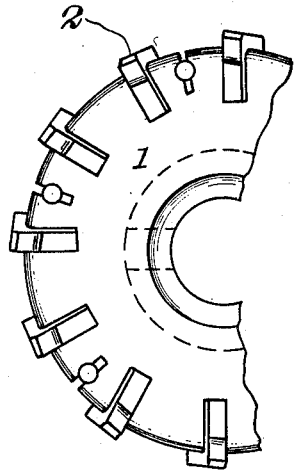
Figure 2 is a front elevation, partially broken away, of the same cutter.
Figure 4:
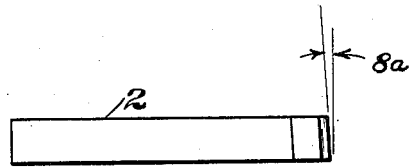
Figure 4 is a top view or plan of the blade illustrated in Figure 3.
Figure 3:
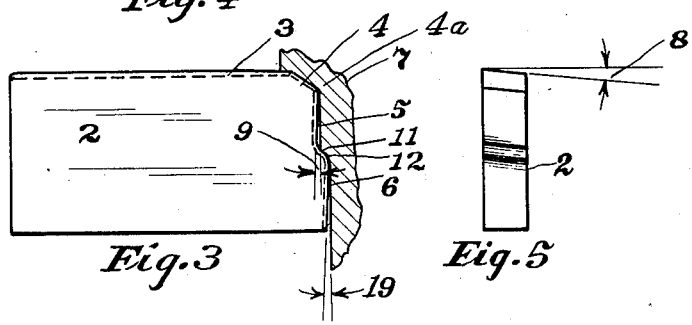
Figure 3 is a side elevation and enlarged of one of the cutter blades shown in Figure 1.
Figure 5:
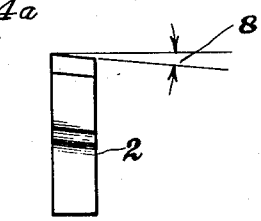
Figure 5 is a front elevation of the blade illustrated in Figure 3.

Since the blades of the cutter are identical in form, one only of the blades as shown in Figure 3 will be described in detail. The cutting edges 3, 4, 5, and 6 are each provided with cutting clearance to provide a true cutting edge as the blade is revolved in contact with the work 7. Such cutting clearance is illustrated in the case of the edge 3 by the angle 8 shown in Figure 5, and in the case of the edge 6 is illustrated by the angle 8ª in Figure 4. The surfaces 5 and 6 form, since 6 is advanced somewhat beyond 5, a step of relatively small dimensions whereby edge 6 is advanced somewhat more into the work than is edge 5, and these edges are furthermore at an angle in relation to the surface of the work as represented by angle 9 in the case of edge 5, and angle 19 in the case of edge 6. Edge 4 represents a bevel provided to prevent a sharp junction between edges 3 and 5, and to avoid other sharp corners, slight roundings are provided at 11 and 12. The roundings 11 and 12 and the bevel 4 may be dispensed with if desired, but are preferred for various reasons.

The junction of edges 4 and 5 produces at 4ᵃ a cutting point or cutting edge 4ᵃ lying in the periphery of a circle having its center coincident with the axis of cutter rotation and in a plane at right angles to the axis, while the junction of rounding 12 and surface 6 likewise forms a similar cutting point or cutting edge lying in the periphery of a smaller circle which also has its center in the axis of cutter rotation but lying in a different plane than the cutting point 4ᵃ, being advanced farther from the body portion along the axis of cutter rotation whereby the point 4ᵃ may be said to lie behind it but at a greater distance from the axis of rotation.

The effect of the construction as shown is to effectively reduce the shock when the blades first meet the work by reducing the depth of the cut at this time.

The cutting edges 4 and 5 as they pass from the work will remove or break out a portion of the work material below the surface 5 as has been previously pointed out, the amount of which will, if other factors are constant, be determined by the depth from the top of the work to the surface 5, and this undesired removal of work material will be considerably less than would be the case were the depth of cut the full depth of material to be removed instead of only a portion as represented by the distance between the top of the work and edge 5. In addition to this, the work surface produced by the edge 5 as the cutting process continues will be in turn removed by the edge 6, the depth of this secondary cutting action being represented by the step or difference in height between the edge 5 and the edge 6, and the final undesired removal of metal below the final or finished surface will be relatively small since it is limited or fixed by the relatively small depth of cut as determined by the relatively small distances between edges 5 and 6, instead of the relatively large depth of cut required to remove the equivalent depth of work material with the ordinary cutter.

The angular relationship of both the edges 5 and 6 to the surface of the work as represented by the angles 9 and 19 prevents dragging of such portions of these cutting edges as are the last to pass over the finished surfaces as the cutter is fed along the work surface and tends to produce a much smoother resulting finished surface, but such angles are relatively very small and the cutting edges 5 and 6 may, for practical purposes, be considered as lying in planes parallel to the end of the cutter body, all of the edges 5 on the various cutter teeth or blades lying in the one plane, while all of the edges 6 lie in another parallel but differently spaced plane.

Furthermore, the breaking up of the chip removed as resulting from the formation of steps in the cutter blade tends toward greater smoothness of action in the cutter in a variety of ways.

Having thus revealed my invention, I claim:

1. In a milling cutter, the combination for the purpose disclosed, of a plurality of cutting teeth all of which have a first cutting edge adapted for work material removal to produce on the work a plane surface vertical to the axis of cutter rotation as the cutter is rotated and traversed in a direction vertical to said axis, and a second cutting edge on all of said teeth adapted when said cutter is rotated and traversed as described, to produce on the work a plane surface parallel to the plane of the first mentioned surface but differently spaced along said axis and corresponding to the finished surface desired on the work.

2. In a milling cutter, the combination of a cutter body of cylindrical form, a plurality of blades removably fixed therein and projecting both from the periphery and from one end of the body cylinder, a cutting edge on each of said blades lying approximately in a plane parallel to the end of the body cylinder, and a second cutting edge on each of said blades lying approximately in a second plane parallel with the first named plane but differently spaced from the end of the body cylinder.

3. In a milling cutter having a body portion and cutting edges advanced therefrom in a direction along its axis of rotation whereby a plane surface is produced when said cutter is traversed in a direction at right angles to said axis, the combination of other cutting edges positioned behind the first mentioned cutting edges and at a substantially greater distance from said axis and adapted to simultaneously produce other plane surfaces differently spaced along said axis.

4. In a milling cutter the combination of cutting edges including a first cutting edge adapted for work material removal to produce on the work a plane surface vertical to the axis of cutter rotation as the cutter is rotated and traversed in a direction vertical to said axis, and a second cutting edge adapted when said cutter is rotated and traversed as described to produce on the work a plane surface parallel to the plane of the first mentioned surface but differently spaced along said axis and corresponding to the finished surface desired on the work.

GEORGE F. HAVLISTA.